United States Patent
Dai et al.

(10) Patent No.: US 9,383,824 B2
(45) Date of Patent: Jul. 5, 2016

(54) GESTURE RECOGNITION METHOD AND WEARABLE APPARATUS

(71) Applicant: Wistron Corporation, New Taipei (TW)

(72) Inventors: Hsih-Bin Dai, New Taipei (TW); Chih-Kang Chen, New Taipei (TW); Wei-Yu Chen, New Taipei (TW); Chien-Chi Shen, New Taipei (TW); Kuo-Hsing Wang, New Taipei (TW); Yi-Sheng Kao, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 223 days.

(21) Appl. No.: 14/094,821

(22) Filed: Dec. 3, 2013

(65) Prior Publication Data

US 2015/0061994 A1    Mar. 5, 2015

(30) Foreign Application Priority Data

Sep. 3, 2013   (TW) ............................. 102131738 A (51) Int. Cl.
*G09G 5/00* (2006.01)
*G06F 3/01* (2006.01)
(Continued)

(52) U.S. Cl.
CPC .............. *G06F 3/017* (2013.01); *G06F 1/163* (2013.01); *G06F 1/1694* (2013.01); *G06F 3/0488* (2013.01)

(58) Field of Classification Search
CPC ..... G06F 1/1694; G06F 3/017; G06F 3/0346; G06F 3/014; G06F 3/0488; G06F 3/04883; G01P 15/00; G06K 9/00355; G06K 9/00375
USPC ......................................... 345/7–9, 156–162
See application file for complete search history.

(56) References Cited

U.S. PATENT DOCUMENTS 6,369,794 B1 *   4/2002   Sakurai ................... G06F 3/017
                                                                345/156
8,421,448 B1     4/2013   Tran et al.
(Continued)

FOREIGN PATENT DOCUMENTS

TW    200920458 A    5/2009
TW    200946872 A1   11/2009
TW    201015382 A    4/2010

OTHER PUBLICATIONS

TW Office Action dated Mar. 13, 2015 in corresponding Taiwan application (No. 102131738).
(Continued)

*Primary Examiner* — Vijay Shankar
(74) *Attorney, Agent, or Firm* — McClure, Qualey & Rodack, LLP (57) ABSTRACT

A wearable apparatus includes a user interface, a motion sensor, a microprocessor and a central processing unit (CPU). In an operation mode, the motion sensor senses a current hand movement trajectory (HMT). The microprocessor generates a velocity curve along a coordinate axis according to the current HMT, and samples the velocity curve according to a first predetermined velocity and a second predetermined velocity to output velocity sampling points. The microprocessor further determines whether a matching number between the velocity sampling points and velocity feature points is greater than a threshold. The current HMT matches a predetermined HMT when the matching number is greater than the threshold. The CPU performs a system operation corresponding to the default HMT when the current HMT matches the predetermined HMT.

10 Claims, 6 Drawing Sheets

(51) Int. Cl.
*G06F 1/16* (2006.01)
*G06F 3/0488* (2013.01)

(56) References Cited

U.S. PATENT DOCUMENTS

| | | | | |
|---|---|---|---|---|
| 2005/0210418 A1* | 9/2005 | Marvit | ................ | G06F 3/0346 715/863 |
| 2007/0171202 A1* | 7/2007 | Yang | ................ | G06F 3/0346 345/158 |
| 2007/0259716 A1* | 11/2007 | Mattice | ................ | G06F 3/013 463/36 |
| 2008/0192005 A1* | 8/2008 | Elgoyhen | ................ | G06F 3/014 345/158 |
| 2009/0265671 A1* | 10/2009 | Sachs | ................ | G06F 3/017 715/863 |
| 2010/0090945 A1 | 4/2010 | Lee et al. | | |
| 2010/0124949 A1* | 5/2010 | Demuynck | ................ | G06F 1/1626 455/569.1 |
| 2010/0318286 A1 | 12/2010 | Lorkowski et al. | | |
| 2011/0054833 A1* | 3/2011 | Mucignat | ................ | G06F 3/017 702/150 |
| 2012/0165074 A1* | 6/2012 | Soldan | ................ | G06F 3/0346 455/566 |
| 2012/0272194 A1* | 10/2012 | Yang | ................ | G06F 3/017 715/863 |
| 2013/0147704 A1* | 6/2013 | Kuo | ................ | G06F 3/017 345/156 |
| 2014/0236529 A1* | 8/2014 | Gyorfi | ................ | G06F 3/017 702/141 |
| 2014/0282270 A1* | 9/2014 | Slonneger | ................ | G06F 3/017 715/863 |

OTHER PUBLICATIONS

Partial English translation of TW Office Action dated Mar. 13, 2015 in corresponding Taiwan application (No. 102131738).

* cited by examiner

GESTURE RECOGNITION METHOD AND WEARABLE APPARATUS

This application claims the benefit of Taiwan application Serial No. 102131738, filed Sep. 3, 2013, the subject matter of which is incorporated herein by reference.

BACKGROUND OF THE INVENTION

1. Field of the Invention

The invention relates in general to an electronic apparatus, and more particularly to a gesture recognition method and a wearable apparatus.

2. Description of the Related Art

When a user operates a product such as a computer system, a computer/video game console or an information household appliance, a human-machine interface (HMI) is needed for inputting an instruction into the product, and the user then obtains an execution result of the product also via the HMI. With the increasing progress of technologies, communication means between the user and the product has become more and more diversified. In other words, user messages received by the HMI are no longer confined to instructions generated by a conventional keyboard or mouse.

For all kinds of HMIs including the mouse, keyboard, touch control panel and remote controller, utilization convenience and functionality are consistently emphasized for manipulations on an electronic product. In the recent years, non-contact gesture control interfaces have emerged as a result of the advancement of image detection HMI technologies. However those technologies may evolve, the concept of product development and design centered around humans stands unaltered. In other words, whether a gesture control interface offers intuitive and convenient operations critically affects the consumer acceptance of the product.

SUMMARY OF THE INVENTION

The invention is directed to a gesture recognition method and a wearable apparatus.

A gesture recognition method is provided by the present invention. The gesture recognition method includes: in an operation mode, sensing a current hand movement trajectory (HMT); generating a velocity curve along a coordinate axis according to the current HMT; sampling the velocity curve according to a first predetermined velocity and a second predetermined velocity to output velocity sampling points; determining whether a matching number between the velocity sampling points and velocity feature points is greater than a threshold, wherein the current HMT matches a predetermined HMT when the matching number is greater than the threshold; and performing a system operation corresponding to the predetermined HMT when the current HMT matches the predetermined HMT.

A wearable apparatus is further provided by the present invention. The wearable apparatus includes a user interface, a motion sensor, a microprocessor and a central processing unit (CPU). In an operation mode, the motion sensor senses a current HMT. The microprocessor generates a velocity curve along a coordinate axis according to the current HMT, and samples the velocity curve according to a first predetermined velocity and a predetermined default velocity to output velocity sampling points. The microprocessor further determines whether a matching number between the velocity sampling points and velocity feature points is greater than a threshold. The current HMT matches a predetermined HMT when the matching number is greater than the threshold. The CPU performs a system operation corresponding to the predetermined HMT when the current HMT matches the predetermined HMT.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
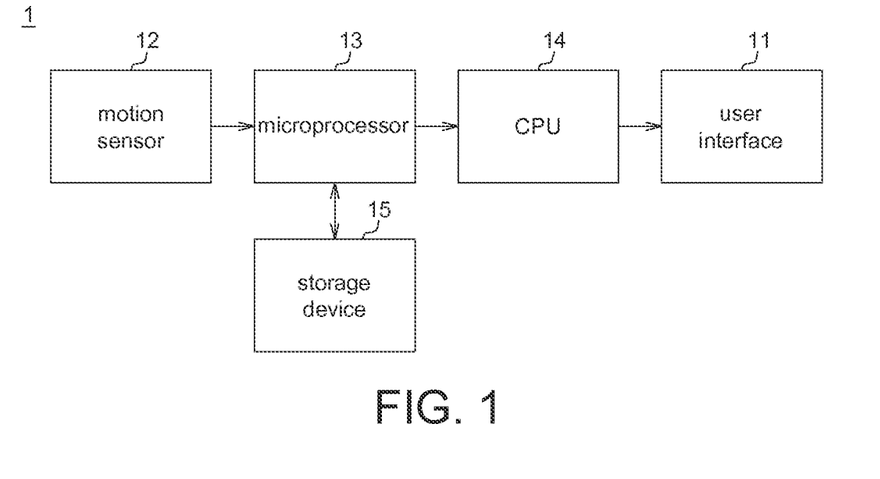
FIG. 1 shows a block diagram of a wearable apparatus according to a first embodiment.
Figure 2:
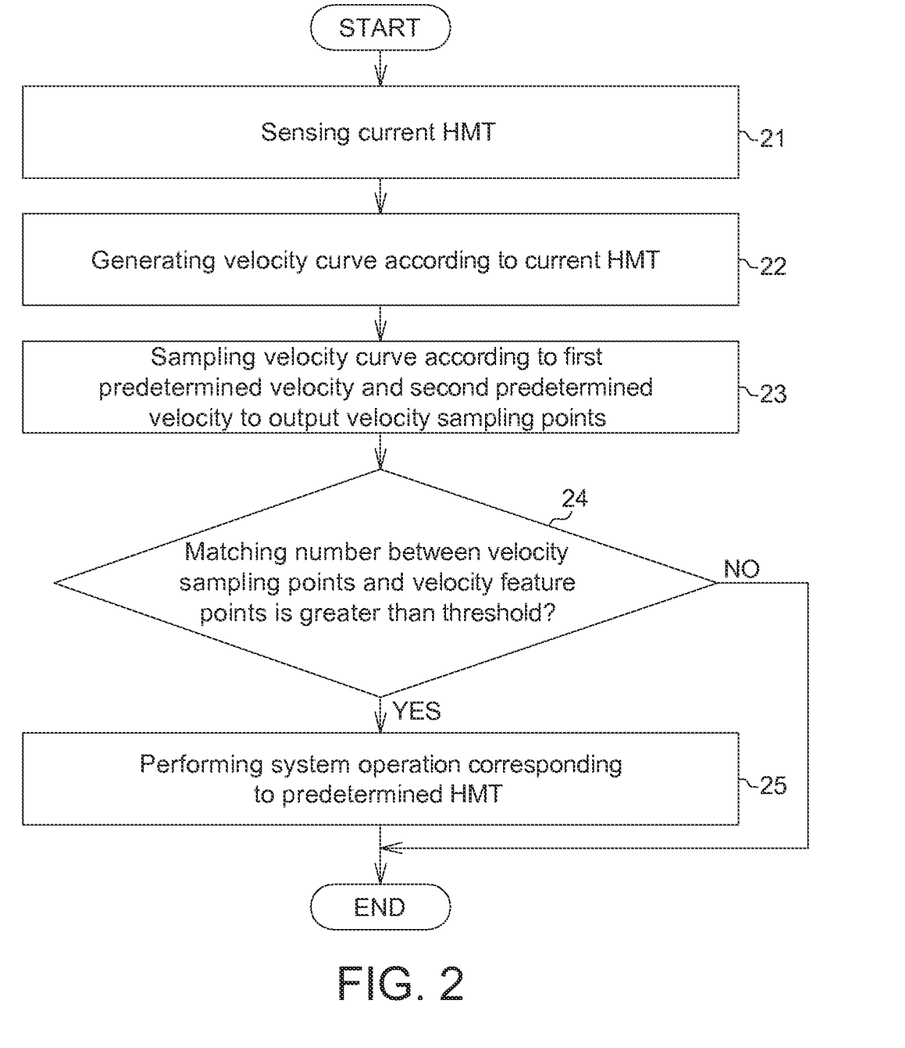
FIG. 2 shows a flowchart of a gesture recognition method.

FIG. 1 shows a block diagram of a wearable apparatus; FIG. 2 shows a flowchart of a gesture recognition method. Referring to FIGS. 1 and 2, a wearable apparatus 1 includes a user interface 11, a motion sensor 12, a microprocessor 13, a central processing unit (CPU) 14 and a storage device 15. For example, the wearable apparatus 1 is a watch, and the user interface 11 is a speaker, a display screen or a touch control panel. The storage device 15 stores velocity feature points of a predetermined hand movement trajectory (HMT). For example, the predetermined HMT represents that the user interface 11 has changed from having a back side facing a user to having a front side facing the user. For another example, the predetermined HMT represents that the user first moves a hand upward and then changes the user interface 11 from having a back side facing the user to having a front side facing the user, or represents that the user first changes the user interface 11 from having a back side facing the user to having a front side facing the user and then moves a hand upward. Alternatively, the predetermined HMT may also represent that the user directly changes the user interface 11 from having a back side facing the user to having a front side facing the user.

The gesture recognition method is applicable to the wearable apparatus 1, and includes the following steps. In step 21, the motion sensor 21 in an operation mode senses a current HMT. In step 22, the microprocessor 13 generates a velocity curve according to the current HMT. In step S23, the microprocessor 13 samples the velocity curve according to a first predetermined velocity and a second predetermined velocity to output velocity sampling points. In step 24, the microprocessor 13 determines whether a matching number between the velocity sampling points and the predetermined feature points is greater than a threshold. The current HMT matches the predetermined HMT when the matching number is greater than the threshold. In step 25, when the current HMT matches the predetermined HMT, the CPU 14 performs a system operation corresponding to the predetermined HMT.

For example, the system operation is activating the user interface 11. When the current HMT does not match the predetermined HMT, the user interface 11 is deactivated. When the user interface 11 is activated by the CPU 14, the user interface 11 may further display information, illuminate, or output a sound.

Figure 3:
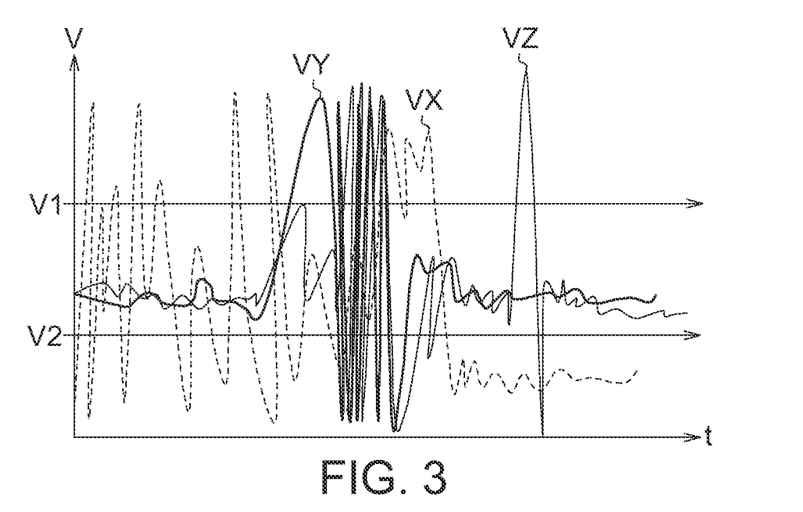
FIG. 3 shows velocity curves along the x-axis, y-axis and z-axis.
Figure 4:
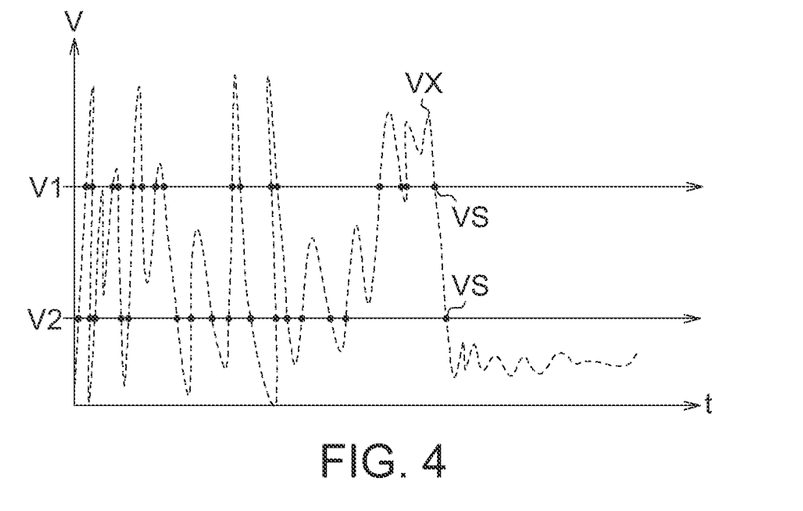
FIG. 4 shows a velocity curve along the x-axis.
Figure 5:
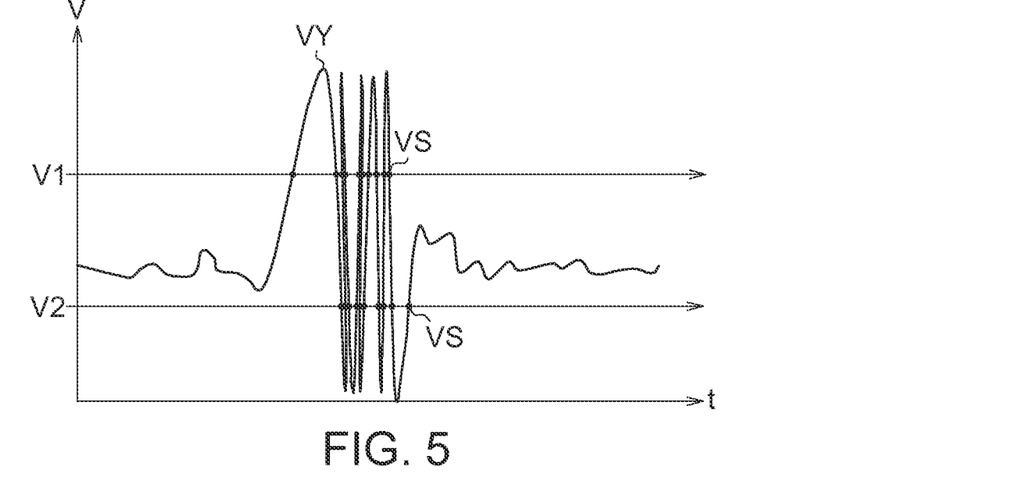
FIG. 5 shows a velocity curve along the y-axis.
Figure 6:
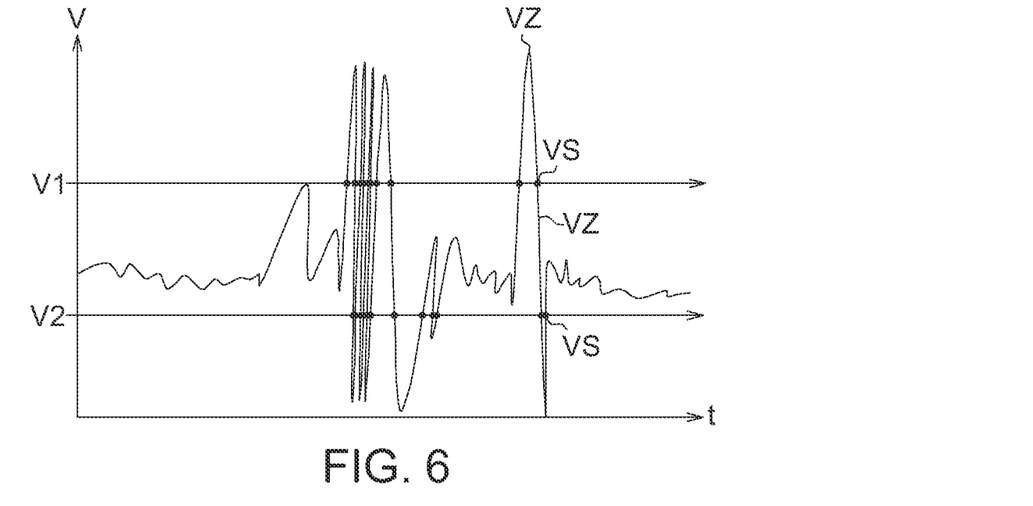
FIG. 6 shows a velocity curve along the z-axis.

FIG. 3 shows velocity curves along the x-axis, y-axis and z-axis; FIG. 4 shows a velocity curve along the x-axis; FIG. 5 shows a velocity curve along the y-axis; and FIG. 6 shows a velocity curve along the z-axis. For illustration purposes, the description of the embodiments below is given by taking the x-axis, y-axis and z-axis as direction axis. In the description, the acceleration is a change rate of a velocity of an object against time, and the velocity is a change rate of a position of the object against time. That is, the velocity v is the differentiation of the position s against the time t, and the acceleration a is the differentiation of the velocity v against the time t. It is assumed that under an initial velocity of zero, v=ds/dt and a=dv/dt. Once acceleration information of an object is acquired, the acceleration information may be integrated once to be converted to velocity information, i.e., v=∫adt. Alternatively, acceleration information may be integrated twice to be converted to displacement information, i.e., s=∫vdt. As such, the amounts of displacement along the x-axis, y-axis and z-axis can be calculated to further calculate the position information.

Further, according to the current HMT, the microprocessor 13 generates a velocity curve VX along the x-axis, a velocity curve VY along the y-axis and a velocity curve VZ along the z-axis. The x-axis, y-axis and z-axis are perpendicular to one another. The microprocessor 13 samples the velocity curves VX, VY and VZ according to a first predetermined velocity V1 and a second velocity V2 to output velocity sampling points VS, and further determines whether a matching number between the velocity sampling points VS and the velocity feature points is greater than a threshold. The value of the threshold may be determined according to a motion precision. The value of the threshold gets larger as the motion precision gets higher, and gets smaller as the motion precision gets lower.

Figure 7:
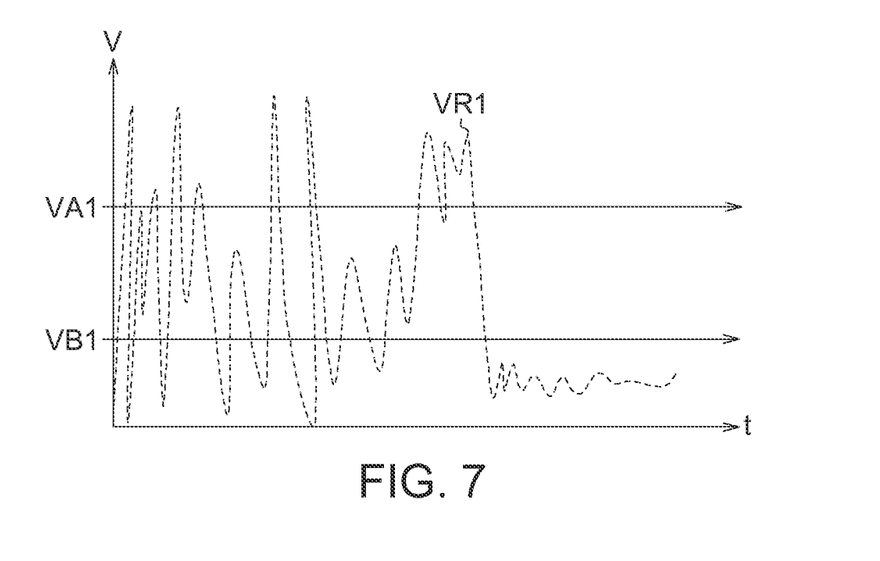
FIG. 7 shows a schematic diagram of a first measured velocity curve.
Figure 8:
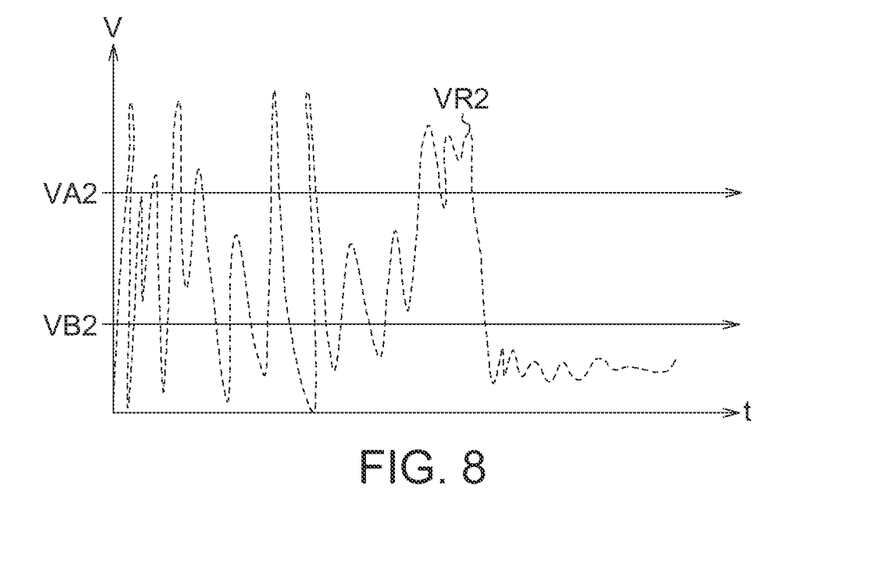
FIG. 8 shows a schematic diagram of a second measured velocity curve.
Figure 9:
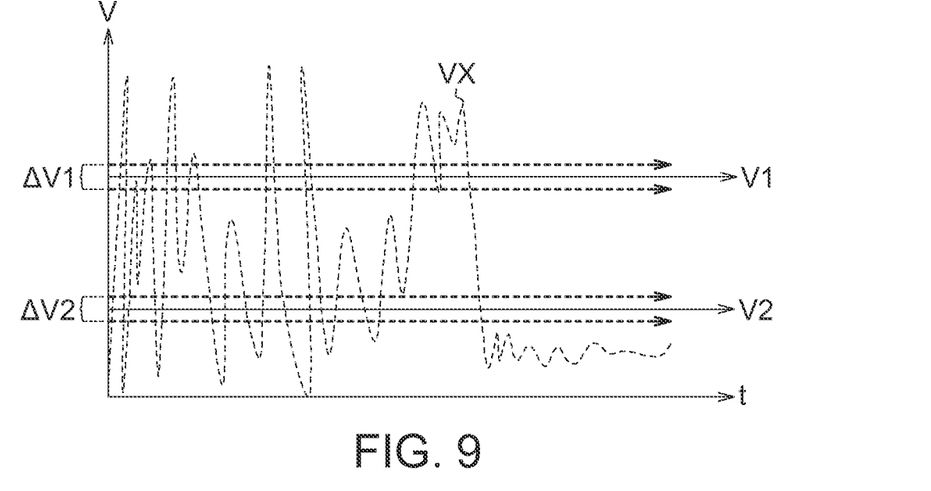
FIG. 9 shows a schematic diagram of a first tolerable range and a second tolerable range.

FIG. 7 shows a schematic diagram of a first measured velocity curve; FIG. 8 shows a schematic diagram of a second measured velocity curve; and FIG. 9 shows a schematic diagram of a first tolerable range and a second tolerable range. For illustration purposes, with reference to FIGS. 1, 7, 8 and 9, the description of embodiments below is given with examples of a first measured velocity curve VR1 and a second measured velocity curve VR2 as measured velocity curves along the x-axis. In addition to the above examples, in an alternative embodiment, the microprocessor 13 may also deduce the first predetermined velocity V1, the second predetermined velocity V2, a first tolerable range ΔV1 and a second tolerable range ΔV2 according to more than two measured velocity curves.

The microprocessor 13 generates the first measured velocity curve VR1 and the second measured velocity curve VR2 according to the predetermined HMT, and sets a first reference velocity VA1 and a second reference velocity VA2. The first reference velocity VA1 and the first measured velocity curve VR1 form a maximum number of intersection points, and the second reference velocity VA2 and the second measured velocity curve VR2 form a maximum number of intersection points.

The microprocessor 13 determines a third reference velocity VB1 according to the first reference velocity VA1 and a precision, and determines a fourth reference velocity VB2 according to the second reference velocity VA2 and the precision. The microprocessor 13 further calculates an average value of the first reference velocity VA1 and the third reference velocity VA2 as a first predetermined velocity V1, and calculates an average value of the second reference velocity VB1 and the fourth reference velocity VB2 as a second predetermined velocity V2. The abovementioned feature points fall above the first predetermined velocity V1 and the second predetermined velocity V2. For illustration purposes, the description of the embodiment is given by taking the first measured velocity curve VR1 and the second measured velocity curve VR2 as examples. In practice, the microprocessor 13 may also determine the first predetermined velocity V1 and the second predetermined velocity V2 based on a greater number of measured velocity curves. For example, assuming that a user repeatedly performs the same operation for 30 times, the microprocessor 13 may then determine the first predetermined velocity V1 and the second predetermined velocity V2 according to 30 measured velocity curves.

The microprocessor 13 determines the first tolerable range ΔV1 of the first predetermined velocity V1 and the second tolerable ramie ΔV2 of the second predetermined velocity V2 according to the first reference velocity curve VR1 and the second reference velocity curve VR2, and samples within the first tolerable range ΔV1 and the second tolerable range ΔV2 to output the velocity sampling points. For illustration purposes, the description of the above embodiment is given by taking the first measured velocity curve VR1 and the second measured velocity curve VR2 as examples. In practice, the microprocessor 13 may determine the first tolerable range ΔV1 and the second tolerable range ΔV2 based on a greater number of measured velocity curves. For example, assuming that a user repeatedly performs the same operation for 30 times, the microprocessor 13 may then determine the first tolerable range ΔV1 and the second tolerable range ΔV2 according to 30 measured velocity curves.

Figure 10:
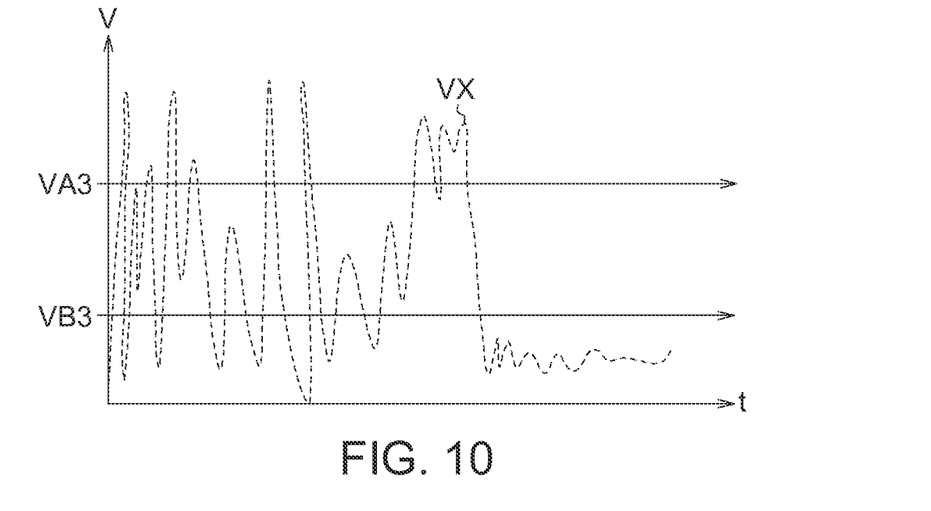
FIG. 10 shows a schematic diagram of a target velocity curve.

FIG. 10 shows a schematic diagram of a target velocity curve. Referring to FIGS. 1, 7, 8, 9 and 10, in a learning mode, the microprocessor 13 is capable of further correcting the first predetermined velocity V1 and the second predetermined velocity V2 according to the velocity curve VX along the x-axis, the velocity curve VY along the y-axis and the velocity curve VZ along the z-axis. Alternatively, in the learning mode, the microprocessor 13 may further correct the first tolerable range ΔV1 and the second tolerable range ΔV2 according to the velocity curve VX along the x-axis, the velocity curve VY along the y-axis and the velocity curve VZ along the z-axis.

For illustration purposes, the target velocity curve is exemplified by the velocity curve VX along the x-axis in the embodiment below. In another embodiment, the target velocity curve may also be the velocity curve VY along the y-axis or the velocity curve VZ along the z-axis. After entering the learning mode, the microprocessor 13 sets a fifth reference velocity VA3, which together with the velocity curve VX form a maximum number of intersection points. The microprocessor 13 determines a sixth reference velocity VB3 according to the fifth reference velocity VA3 and the precision. Further, the microprocessor 13 calculates an average value of the first reference velocity VA1, the third reference velocity VA2 and the fifth reference velocity VA3 as the first predetermined velocity V1, and calculates an average value of the second reference velocity VB1, the fourth reference velocity VB2 and the sixth reference velocity VB3 as the second predetermined velocity V2. As such, the wearable apparatus 1 is capable of self-correcting the first predetermined velocity V1, the second predetermined velocity V2, the first tolerable range ΔV1 and the second tolerable range ΔV2 according to the velocity curve VX along the x-axis, the velocity curve VY along the y-axis and the velocity curve VZ along the z-axis.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modification and similar arrangements and procedures.

What is claimed is:

1. A wearable apparatus, comprising:
a user interface;
a motion sensor, configured to, in an operation mode, sense a current HMT;
a microprocessor, configured to generate a plurality of measured velocity curves according to a predetermined hand movement trajectory (HMT), to determine a first predetermined velocity and a second predetermined velocity according to the plurality of measured velocity curves, to generate a plurality of velocity curves along a plurality of coordinate axes according to the current HMT, to sample the plurality of velocity curves according to the first predetermined velocity and the second predetermined velocity to output a plurality of velocity sampling points, and to determine whether a matching number of between the plurality of velocity sampling points matching with a plurality of velocity feature points is greater than a threshold, the current HMT matching a predetermined HMT when the number is greater than the threshold, wherein the plurality of velocity sampling points are intersection points of the velocity curves and the first predetermined velocity, and intersection points of the velocity curves and the second predetermined velocity;
a storage device, configured to store a plurality of velocity feature points of the predetermined HMT, wherein the plurality of velocity feature points are intersection points of the plurality of measured velocity curves and the first predetermined velocity, and intersection points of the plurality of measured velocity curves and the second predetermined velocity; and
a central processing unit (CPU), configured to perform a system operation corresponding to the predetermined HMT when the current HMT matches the predetermined HMT;
wherein the predetermined HMT represents that a user interface changes from having a back side facing a user to having a front side facing the user.

2. The wearable apparatus according to claim 1, wherein the microprocessor generates a first measured velocity curve and a second measured velocity curve according to the predetermined HMT; sets a first reference velocity and a second reference velocity, the first reference velocity and the first measured velocity curve forming a maximum number of intersection points, the second reference velocity and the second measured velocity curve forming a maximum number of intersection points; determines a third reference velocity according to the first reference velocity and a precision, and determines a fourth reference velocity according to the second reference velocity and the precision; calculates a first predetermined velocity according to an average value of the first reference velocity and the third reference velocity, and calculates the second predetermined velocity according to an average value of the second reference velocity and the fourth reference velocity; and the velocity feature points fall above the first predetermined velocity and the second predetermined velocity.

3. The wearable apparatus according to claim 2, wherein the microprocessor determines a first tolerable range of the first predetermined velocity and a second tolerable range of the second predetermined velocity according to the first reference velocity curve and the second reference velocity curve, and samples the plurality of velocity curves samples within the first tolerable range and the second tolerable range to output the plurality of velocity sampling points.

4. The wearable apparatus according to claim 1, wherein the system operation is activating the user interface.

5. The wearable apparatus according to claim 1, wherein the coordinate axes comprise a first direction axis, a second direction axis and a third direction axis; the first direction axis, the second direction axis and the third direction axis are perpendicular to one another.

6. A gesture recognition method, comprising:
generating a plurality of measured velocity curves according to a predetermined hand movement trajectory (HMT);
determining a first predetermined velocity and a second predetermined velocity according to the plurality of measured velocity curves;
storing a plurality of velocity feature points of the predetermined HMT, wherein the plurality of velocity feature points are intersection points of the plurality of measured velocity curves and the first predetermined velocity, and intersection points of the plurality of measured velocity curves and the second predetermined velocity;
in an operation mode, sensing a current hand movement trajectory (HMT);
generating a plurality of velocity curves along a plurality of coordinate axes according to the current HMT;
sampling the plurality of velocity curves according to the first predetermined velocity and the second predetermined velocity to output a plurality of velocity sampling points, wherein the plurality of velocity sampling points are intersection points of the velocity curves and the first predetermined velocity, and intersection points of the velocity curves and the second predetermined velocity;
determining whether a number of the plurality of velocity sampling points matching with a plurality of velocity feature points is greater than a threshold, the current HMT matching a predetermined HMT when the number is greater than the threshold; and
performing a system operation corresponding to the predetermined HMT when the current HMT matches the predetermined HMT;
wherein the predetermined HMT represents that a user interface changes from having a back side facing a user to having a front side facing the user.

7. The gesture recognition method according to claim 6, further comprising:
generating a first measured velocity curve and a second measured velocity curve according to the predetermined HMT;
setting a first reference velocity and a second reference velocity, the first reference velocity and the first measured velocity curve forming a maximum number of intersection points, the second reference velocity and the second measured velocity curve forming a maximum number of intersection points;
determining a third reference velocity according to the first reference velocity and a precision, and determining a fourth reference velocity according to the second reference velocity and the precision;

calculating the first predetermined velocity according to an average value of the first reference velocity and the third reference velocity, and calculating the second predetermined velocity according to an average value of the second reference velocity and the fourth reference velocity;

wherein, the velocity feature points fall above the first predetermined velocity and the second predetermined velocity.

8. The gesture recognition method according to claim 7, further comprising:

determining a first tolerable range of the first predetermined velocity and a second tolerable range of the second predetermined velocity according to the first reference velocity curve and the second reference velocity curve;

wherein, the step of sampling the plurality of velocity curves samples within the first tolerable range and the second tolerable range to output the plurality of velocity sampling points.

9. The gesture recognition method according to claim 6, wherein the system operation is activating a user interface.

10. The gesture recognition method according to claim 6, wherein the coordinate axes comprise a first direction axis, a second direction axis and a third direction axis; the first direction axis, the second direction axis and the third direction axis are perpendicular to one another.

\* \* \* \* \*